United States Patent [19]

Sturman et al.

[11] Patent Number: 4,541,454
[45] Date of Patent: * Sep. 17, 1985

[54] PRESSURE REGULATORS

[76] Inventors: Oded E. Sturman, 18241 Andrea Cir. N.; Benjamin Grill, 9819 Ediwanda Ave., both of Northridge, Calif. 91329; Lynn Harrison, 23554 Cherry St., Newhall, Calif. 91321

[*] Notice: The portion of the term of this patent subsequent to May 14, 2002 has been disclaimed.

[21] Appl. No.: 593,719

[22] Filed: Mar. 26, 1984

Related U.S. Application Data

[63] Continuation-in-part of Ser. No. 327,800, Dec. 7, 1981, abandoned.

[51] Int. Cl.$^4$ .............................................. F16K 31/12
[52] U.S. Cl. ............................... 137/505.41; 137/495; 137/505.18; 251/367
[58] Field of Search ................... 137/505.18, 219, 220, 137/505, 505.14, 505.15, 505.25, 505.41; 251/367

[56] References Cited

U.S. PATENT DOCUMENTS

| | | | |
|---|---|---|---|
| 718,694 | 1/1903 | Chapman | 137/505.18 |
| 1,483,240 | 2/1924 | Olso | 137/495 |
| 2,091,051 | 8/1937 | Mesinger | 137/505.18 |
| 2,730,269 | 1/1956 | Earle | 137/505.18 X |
| 2,920,647 | 1/1960 | Mercier | 137/505.18 |
| 2,950,739 | 8/1960 | Lofink | 92/99 X |
| 3,336,934 | 8/1967 | Clements | 137/116 |
| 4,243,069 | 1/1981 | Piet | 137/505.19 X |
| 4,271,864 | 6/1981 | Neff | 137/505.18 |
| 4,314,582 | 2/1982 | Drori | 137/495 |

FOREIGN PATENT DOCUMENTS

| | | | |
|---|---|---|---|
| 962161 | 2/1975 | Canada | 137/505.18 |
| 2305687 | 8/1973 | Fed. Rep. of Germany . | |

Primary Examiner—Harold W. Weakley
Attorney, Agent, or Firm—Blakely, Sokoloff, Taylor & Zafman

[57] ABSTRACT

A pressure regulator is disclosed which includes a valve housing with a sliding piston member defining inlet and outlet chambers. A valve seat in conjunction with the piston member forms a valve controlling fluid passing from the inlet to the outlet chamber. The piston member includes a piston and piston plate, the piston plate engaging the valve seat to control fluid flow. The diameters of the chambers and the piston are selected so that the inlet pressure causes no net force on the moving piston member, and does not contribute to either the opening or closing of the valve. On the outlet side, the piston plate is sealed with respect to the valve seat at a diameter which is less than that of the piston plate, such that the outlet pressure creates a net force urging the piston plate to engage the valve seat. The resulting unbalanced output force on the member is opposed by coil spring urging the member upward to unseat the plate from the valve seat. The output pressure is thereby regulated at a point where the outlet force equals the spring force. Alternate embodiments allowing selection of the spring force are disclosed.

9 Claims, 19 Drawing Figures

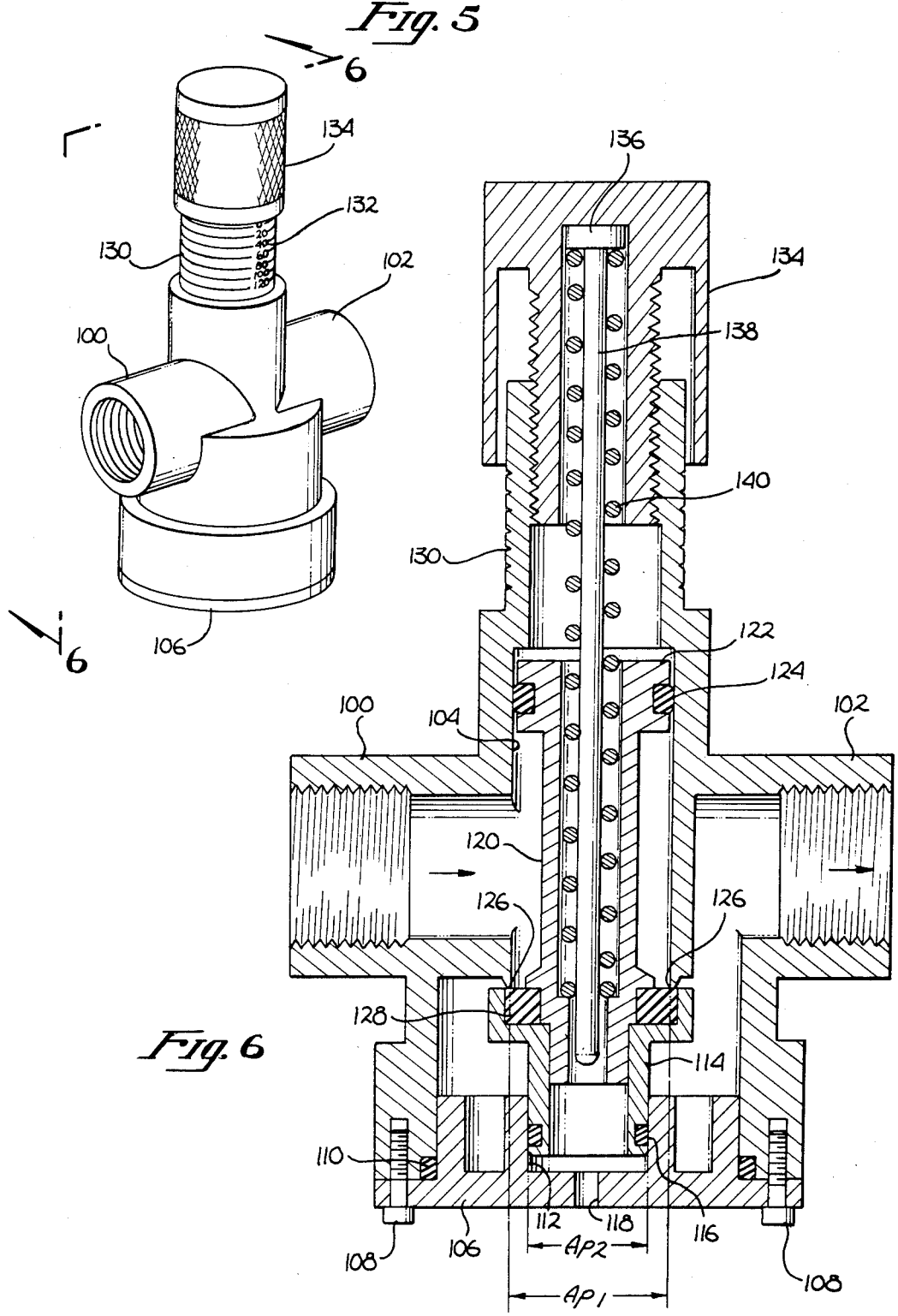

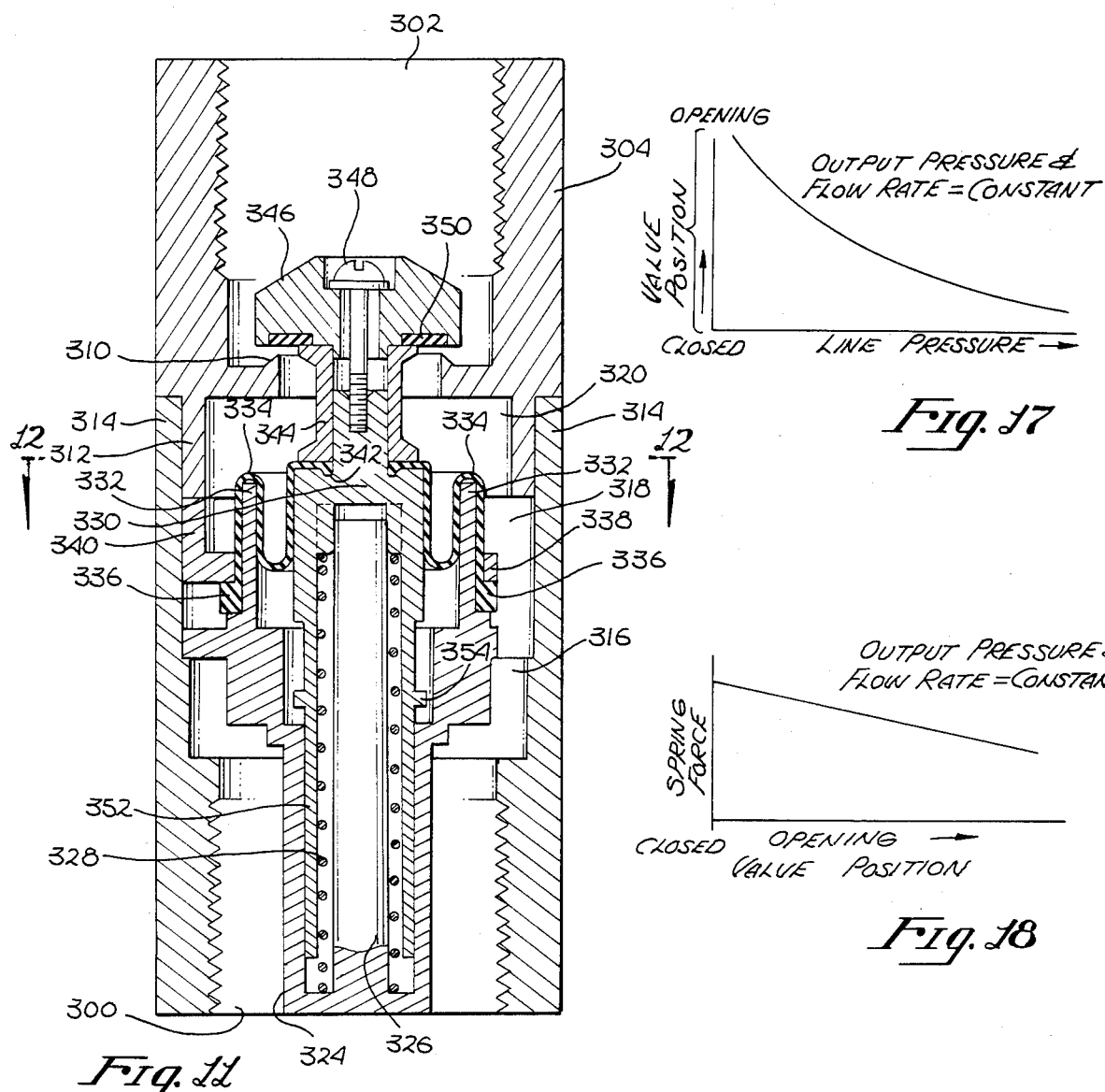
Fig. 11
Fig. 17
Fig. 18
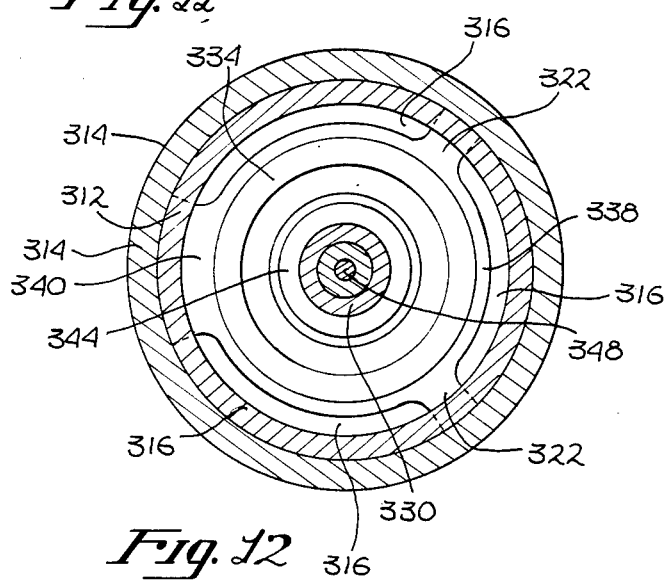
Fig. 12
Fig. 19

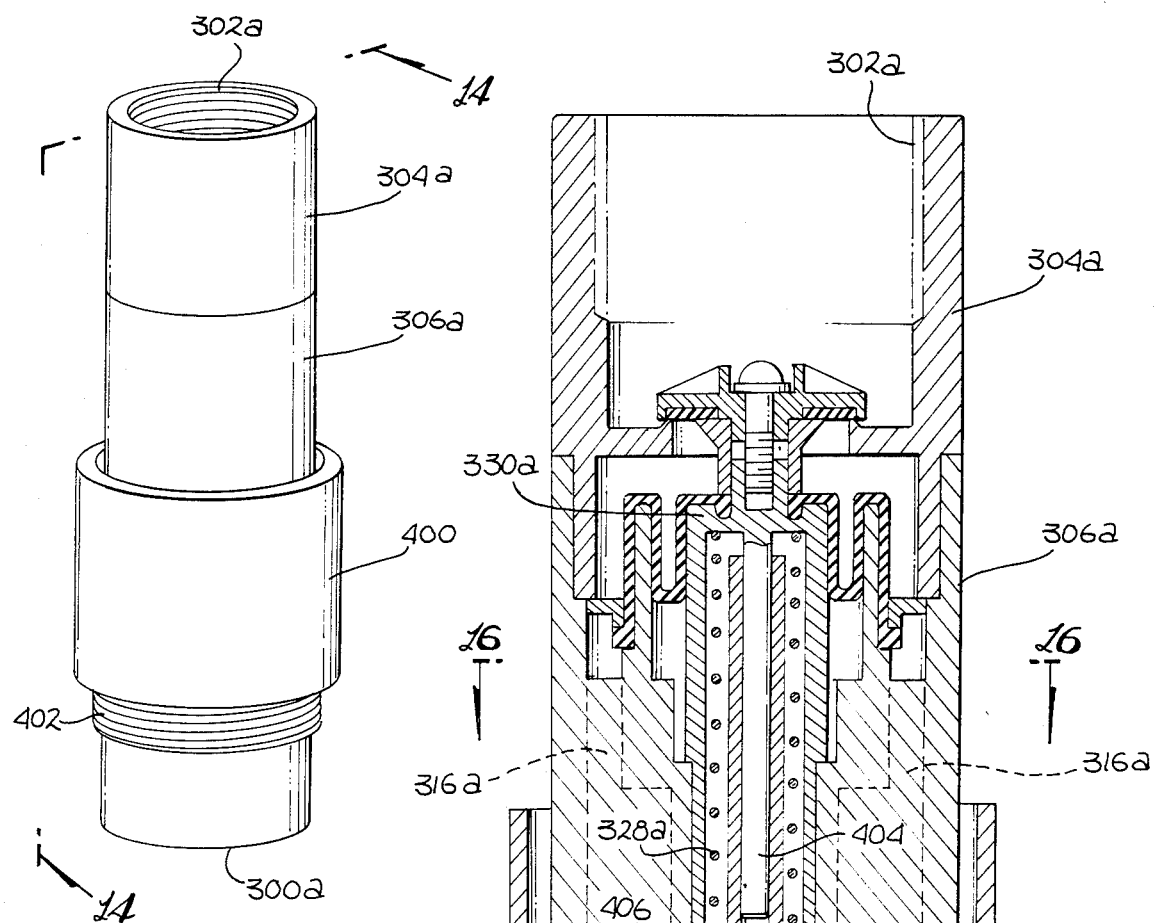
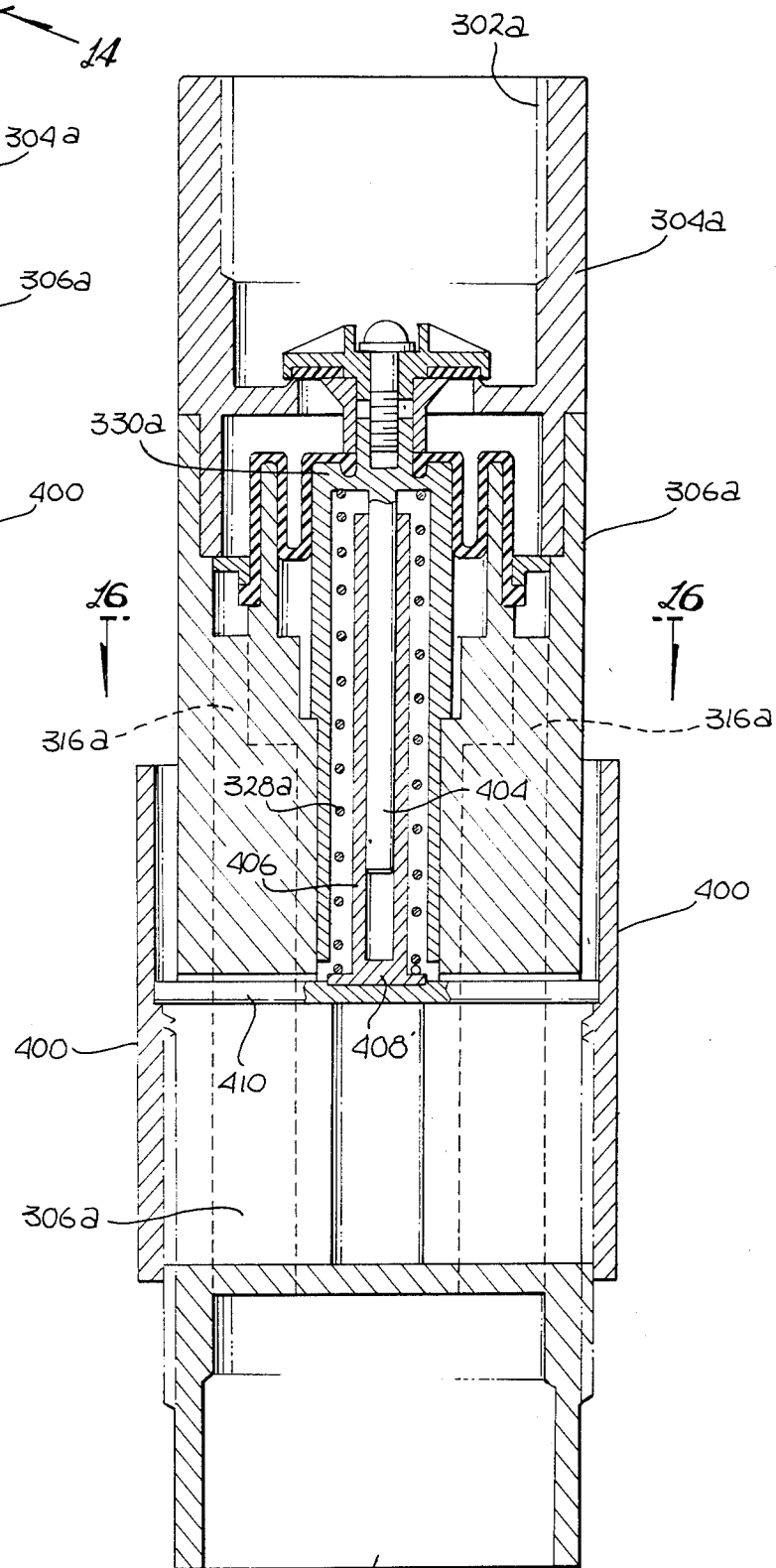
Fig. 13
Fig. 14

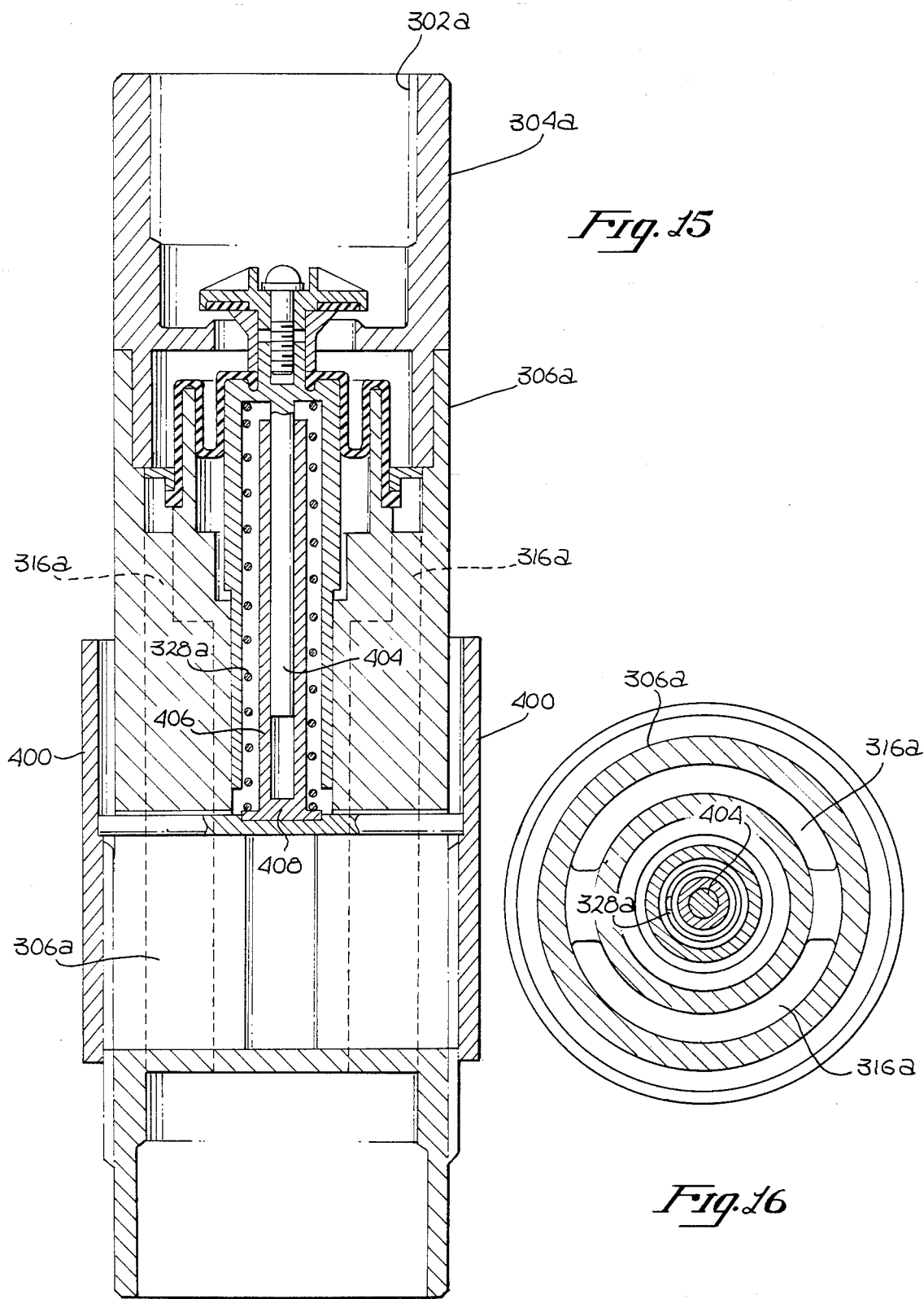

PRESSURE REGULATORS

This is a continuation-in-part of application Ser. No. 327,800 filed Dec. 7, 1981, now abandoned.

BACKGROUND OF THE INVENTION

1. Field of the Invention

The present invention relates to pressure regulator, and more particularly, to those regulators using internal pressure balances for proper operation.

2. Prior Art

Pressure regulators to date which have relied on the internal balancing of fluid forces for operation, have been noted for their structural complexity and cost. Frequently, numerous springs, diaphragms and machined pieces were necessary to obtain a functional assembly. In addition, although the concept of balancing internal forces within a valve to ease operation is known in the Art, prior to the present invention, no regulator valve of which the applicant is aware balanced inlet pressure while using the outlet pressure to directly open or close the valve in response to a predetermined biasing force.

An example of a pressure balanced regulator is U.S. Pat. No. 3,756,558 by Okui. Okui discloses a fluid control valve having an inlet 17 and an outlet 21, with a moving member between the inlet and outlet chambers. In the Okui valve, *both* the input and output portions of his device are pressure balanced, thereby requiring additional structure to sense the outlet pressure and control the moving member for regulation of flow. This additional structure adds cost to the device, and increases the likelihood of breakdown. As will be discussed below, the present invention minimizes cost and subsequent breakdowns by providing a simple but effective use of internal pressure balancing.

An additional example of previous pressure regulating valves is U.S. Pat. No. 702,266 by Webb. As with Okui, Webb discloses a valve which is pressure balanced on the input side. However, there is no pressure balance on the output side of Webb's device and thus the total outlet pressure acts to close the valve. Thus, Webb does not permit control of the valve actuation forces through the use of the natural output pressure passing through the valve.

Accordingly, there exists a need for a pressure regulating valve which is structurally simpler and more cost effective than existing valves.

SUMMARY OF THE INVENTION

In accordance with the present invention, a pressure regulator is provided wherein the fluid pressure is balanced on the inlet side and partially balanced on the output side. The regulator comprises a valve housing with a sliding piston member within the housing defining an inlet and outlet chamber. A valve seat in conjunction with the piston member forms a valve controlling fluid passing from the inlet to the outlet chamber. The piston member includes a piston and piston plate, the piston plate engaging the valve seat to control fluid flow. The diameters of the chambers and the piston are selected so that the inlet pressure is balanced. Thus, the inlet pressure causes no net force on the moving piston member, and does not contribute to either the opening or the closing of the valve. On the outlet side, the piston plate is sealed with respect to the valve seat at a diameter which is less than that of the piston plate, such that the outlet pressure causes a force on the piston to seat the member against the valve seat. This unbalanced force on the member is opposed by a coil spring providing a force on the piston so as to unseat the piston plate from the valve seat. Thus, the outlet pressure will be regulated at a point where the net unbalanced outlet force equals the spring force. Additional embodiments are disclosed which allow the force of the coil spring to be selectively adjusted, thereby permitting fluid regulation at a variety of outlet pressures.

Other objects as well as various inherent advantages of the invention will become more readily apparent from the following detailed description, which proceeds with reference to the accompanying drawings:

BRIEF DESCRIPTION OF THE DRAWINGS

FIG. 5 is perspective view of an alternate embodiment of the present invention;

FIG. 6 is a vertical cross sectional view taken along line 6—6 of FIG. 5, showing the valve as depicted in FIG. 5 in a closed position;

FIG. 9 is a perspective view of a further alternate embodiment of the invention.

FIGS. 10 and 11 are cross-sectional views of the regulator of FIG. 9 illustrating the regulator in the closed and open positions, respectively.

FIG. 12 is a cross section view taken along line 12—12 of FIG. 10.

FIGS. 13 through 16 are views of a still further alternate embodiment corresponding to FIGS. 9 through 12 for the embodiment of FIG. 9.

FIGS. 17 through 19 are curves illustrating spring rate compensation over a range of inlet pressures for a given regulator flow rate.

DETAILED DESCRIPTION OF THE INVENTION

Figure 1:
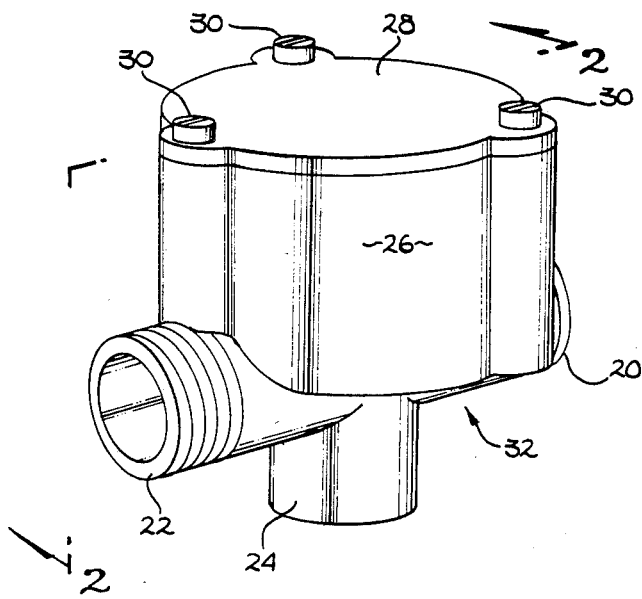
FIG. 1 is a perspective view of a pressure regulator in accordance with the first embodiment of the present invention.

First referring to FIG. 1, a prospective view of one embodiment of the present invention may be seen. This particular embodiment is characterized by a body having an inlet port 20 and an outlet port 22, the inlet and outlet ports of this embodiment being threaded for connection to standard threaded coupling systems. Obviously, however, other, preferably standard couplings may be provided for ports 20 and 22, such as by way of example, unthreaded cylindrical protrusions for coupling to flexible hosing using conventional hose clamps. In addition to the inlet and outlet ports, the body is further characterized by a relatively small diameter cylindrical protrusion 24 and a considerably larger upper cylindrical region 26, the upper region 26 being capped by a top plate 28 held in position by three screws 30 threaded into the top of the body.

Figure 2:
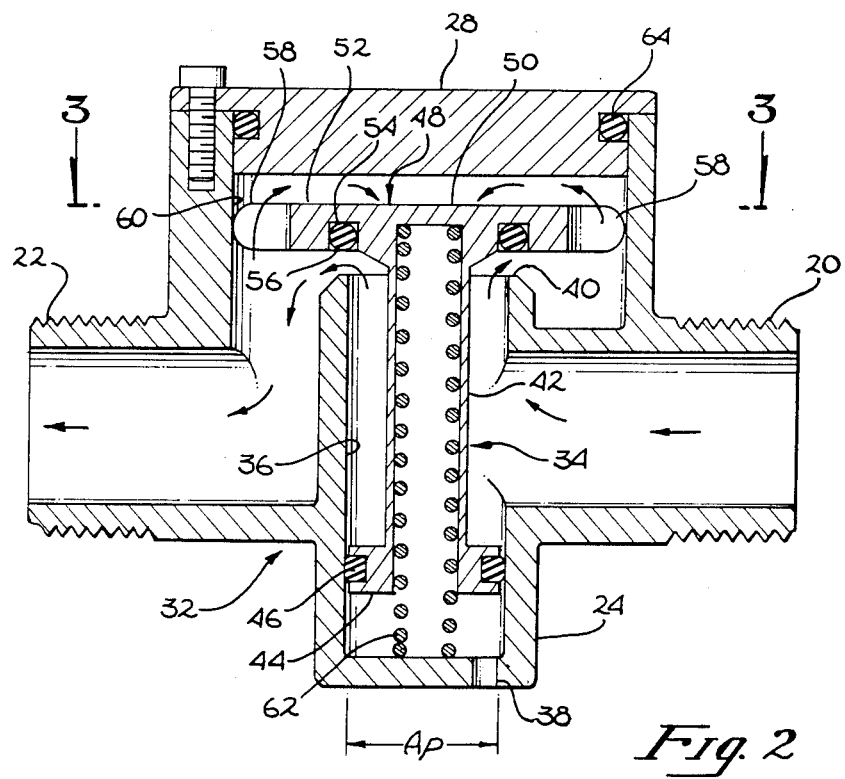
FIG. 2 is a vertical cross section of the valve of FIG. 1 taken along line 2—2 of FIG. 1, showing the regulator in an open position.
Figure 4:
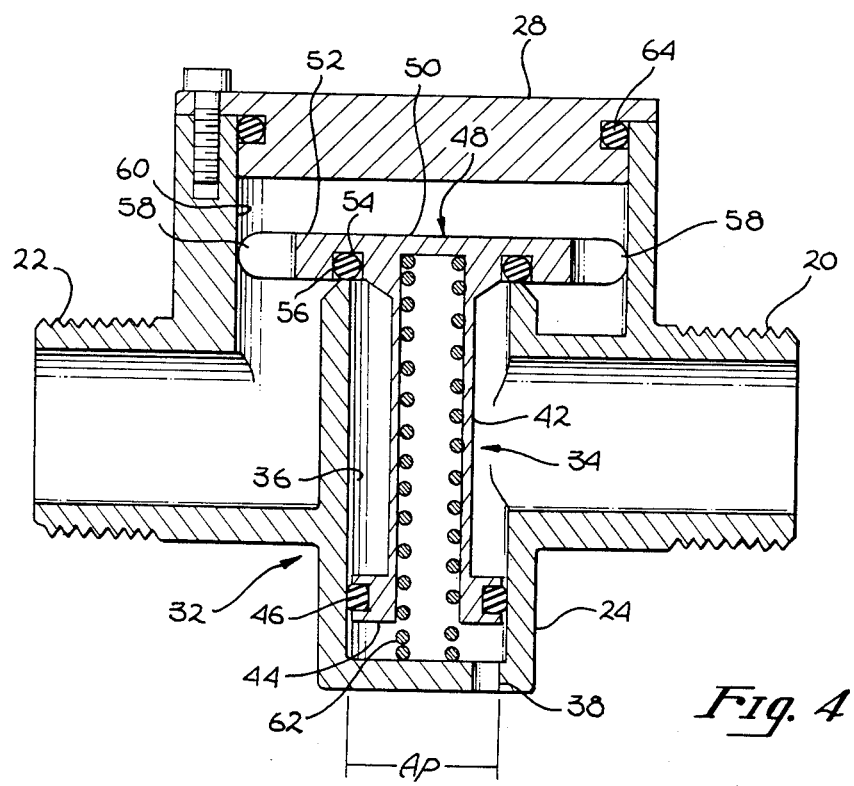
FIG. 4 is a vertical cross section of the pressure regulator illustrated in FIG. 2, showing the in a closed position.

Now referring to FIG. 2, a cross section of the pressure regulator of FIG. 1 taken along line 2—2 of that figure may be seen. This figure illustrates the internal structure and mechanism of the pressure regulator, specifically illustrating that mechanism in a regulating valve open position characteristic of the state of the regulator when delivering substantial flow rates of fluid through the outlet port 22 at the regulated pressure. FIG. 4 is a similar cross section, though illustrating the state of the regulator when the outlet flow through port 22 is substantially zero. The flow through the outlet port, of course, is dependent not upon the pressure regulator, but upon the flow through whatever means or system is coupled to the outlet port, the regulator valve opening and closing in response to relatively low pressure changes at the outlet port 22, as shall subsequently be described in greater detail.

Aside from the body, generally indicated by the numeral 32, and the cap 28, there is contained within the body 32 a piston-like member, generally indicated by the numeral 34. The piston-like member fits within a cylinder 36 in body 32. The cylinder 36 in this embodiment is generally orthogonal to the substantially coaxial inlet and outlet ports, being intercepted intermediate the ends of the cylinder by the inlet port 20. At one end (specifically the lower end as oriented in FIGS. 2 and 4) the cylinder 36 is vented to the atmosphere through a vent hole 38. At the upper end the cylinder 36 terminates at a valve seat 40, the valve seat being configured so as to have a diameter substantially equal to the diameter of the cylinder itself. The inlet port 20, of course, is in direct fluid communication with the outlet port 22 through the area defined by the valve seat 40.

Figure 3:
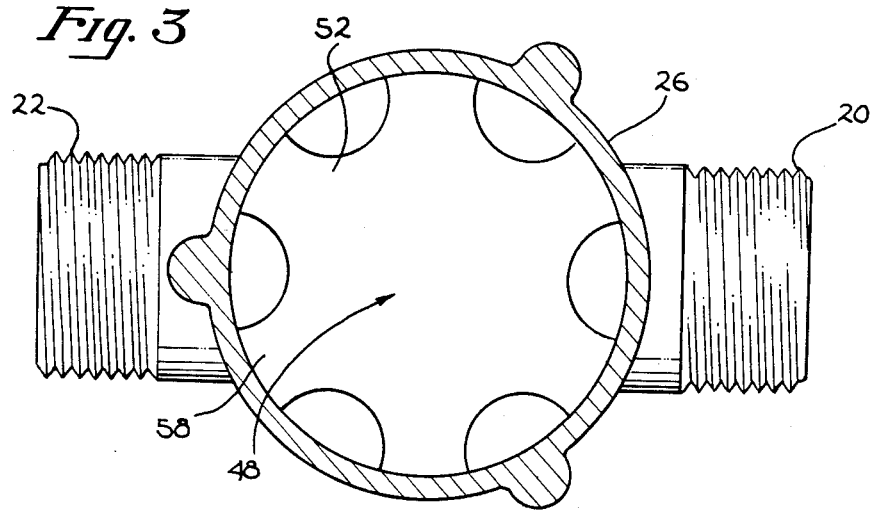
FIG. 3 is a partial elevational cross section of the preferred embodiment taken along line 3—3 of FIG. 2 showing the shape of a piston plate.

The piston-like member 34 is characterized by a central cylindrical section 42 of a diameter substantially less than the cylinder 36 so as to provide an anular flow region therebetween of substantial cross sectional area. At the lower end of the cylindrical section 42 is a flanged area 44 containing an O-ring 46 for slideably and sealingly engaging the lower region of cylinder 36. At the upper end of cylindrical region 42 is a piston plate generally indicated by the numeral 48, characterized by a central region 50 and a peripheral region 52. The central region 50 and peripheral region 52 are effectively separated by a groove 54 containing an O-ring 56 of the same diameter as the valve seat 40. As may be seen in FIG. 3, which is a view taken along line 3—3 of FIG. 2, the peripheral region of 52 of top plate 48 has a plurality of radially outwardly extending fingers 58 loosely slidable on the internal cylindrical surface 60 of the upper portion 26 of the body 32 of the regulator.

The piston-like member 34 is a generally hollow member with a coil spring 62 being disposed within the piston-like member to yieldably encourage the piston-like member in an upward direction with a predetermined force, as set by the spring rate and preload of the coil spring. The piston-like member 34 and the coil spring, of course, are readily assembled as shown prior to the placement of cap 28 in position, the cap itself being sealed with respect to the upper portion 26 of the body 32 by O-ring 64. Thus it may be seen that the entire assembly is comprised of three specially formed pieces, specifically body 32, piston-like member 34 and cap 28, three screws for holding the cap on, three O-rings and a coil spring. The three special parts, specifically the piston-like member, the body and the cap, may be injection molded plastic parts if desired, as a substantial percentage of the market for pressure regulators of this type would be expected to be for providing regulated pressures in the range of 5 to 100 psi from a source having an upper pressure limit of not much higher 100 psi. In that regard, even the source may itself be regulated, as pressure regulators are frequently used to receive fluid from a regulated source and to deliver that fluid at a lower regulated pressure.

The operation of the device of FIGS. 1 through 4 is as follows. Referring first to FIG. 4, it will be noted that the pressure in inlet port 20 acts on both the upper and lower portion of the piston-like member 34 with equal force so that there is no net force on the piston-like member due to the inlet pressure. There is a force through vent 38, specifically a force upward equal to $P_a \times A_p$, where $P_a$ is the atmospheric pressure and $A_p$ is the area of the piston-like member in cylinder 36, i.e., the cross-sectional area of the cylindrical region 36. In addition, of course, there is an upward force due to the spring $F_s$. With respect to the pressure on the outlet side of the regulator, that pressure acts equally on the upper and lower surfaces of the peripheral region 52 of the piston plate 48 so as to cause no net force thereon. However, with respect to the central region 50 of the piston plate, the outlet pressure force is not balanced, so that there is a downward force equal to $P_o \times A_p$, where $P_o$ is the absolute outlet pressure of the regulator. Thus:

$$F_s + P_a \times A_p = P_o \times A_p, \text{ or } F_s = A_p(P_o - P_a) = A_p \times P_{og}$$

where $P_{og}$ is the guage pressure output of the regulator. Thus, in operation, variation in the inlet pressure has no effect on the operation of the device. If the outlet pressure tends to fall below the regulated value, the pressure force on the top of the piston-like member 34 drops so that coil spring 62 urges the piston-like member upward toward the valve open position of FIG. 2, supplying sufficient fluid through the outlet port to maintain the outlet pressure at the regulated value. If, on the other hand, the flow in whatever utilization means is using the output of the regulator falls to zero, the valve will close at the regulated pressure as shown in FIG. 4.

The pressure regulator of FIGS. 1 through 4 is particularly advantageous because of its simplicity and ease of manufacture, while still providing good regulation over various flow and inlet pressure ranges. In certain instances however, the force requirements of the coil spring 62 to meet the size and pressure requirements of such regulators is inconvenient to achieve. Further, there may be numerous applications wherein an adjustable regulator would be desired. Thus, an alternate embodiment regulator may be seen in FIGS. 5 through 7. This embodiment has a body having an inlet port 100 and an outlet port 102, the inlet port intercepting an internal cylindrical region 104 of the body. The body is sealed at the bottom thereof by a bottom plate 106 held in position by screws 108 and sealed with respect to the body by O-ring 110. The bottom plate 106 contains a small upward facing cylinder 112 of area $A_{p2}$, the area of cylindrical region 104 being $A_{p1}$. Slideably fitting within cylinder 112 is a member 114, sealed with respect to the cylinder by an O-ring 116. The cylinder itself is vented through opening or vent 118 in the bottom cap 106.

Member 114 is joined by threads, solvent welding or ultrasonic welding to the lower portion of a piston-like member 120, the upper end of which has a flange 122 thereon sliding within the cylindrical region 104 and being sealed with respect thereto by O-ring 124. The lower end of the cylindrical region 104 ends in a valve seat 126, with a rubber or rubber-like sealing member 128 trapped between member 114 and piston-like member 120 providing a good seal with the valve seat when the assembly is in the upper position shown in FIG. 6.

Figure 7:
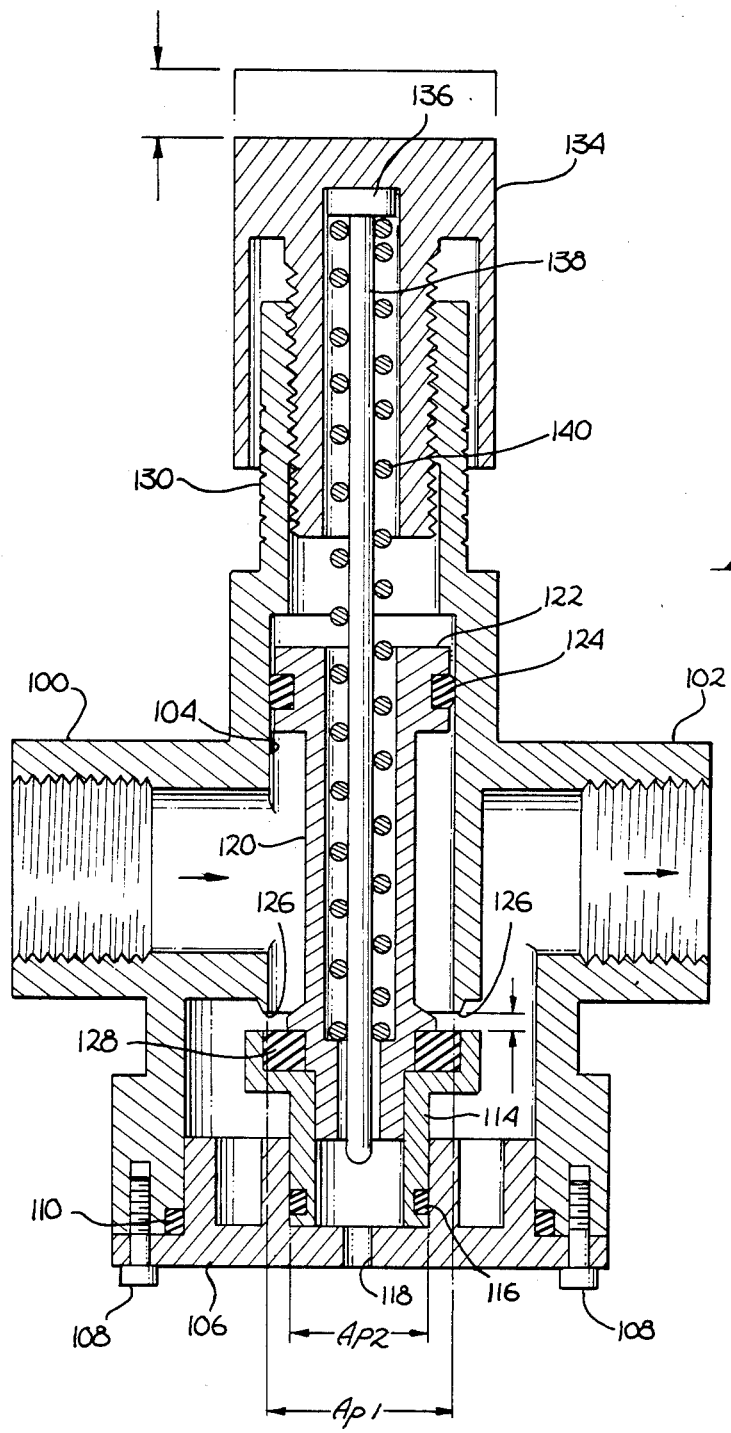
FIG. 7 depicts the valve of FIG. 6 in an open position.

At the top of the body is a threaded stem 130 containing an appropriate scale 132 thereon, which in conjunction with the lower edge of screw cap 134 provides a readily visible indication of the pressure setting of the regulator. The screw cap 134, as may be seen in FIGS. 6 and 7, is configured to receive the head 136 of a metal pin 138, which pin maintains coil spring 140 straight, preventing the coil spring from buckling under the compressive load therein. The coil spring, as may be seen in FIGS. 6 and 7, exerts a downward force on the lower end of piston-like member 120, encouraging the assembly of the piston-like member 120, member 114 and rubber seal member 128 downward.

This configuration functions very similar to the embodiment of FIGS. 1 through 4, with various exceptions. For instance, the inlet pressure is balanced, as may be seen in FIG. 6, in that the inlet pressure creates no net force on the moving assembly. Similarly the atmospheric pressure forces within the area of cylindrical region 112, specifically the area $A_{p2}$ are balanced by the atmospheric pressure forces within the same area above region 122 of the piston-like member 120. Outside this area, i.e., in the angular area between the diameter of the area $A_{p2}$ and the area $A_{p1}$ of the cylindrical region 104, the full outlet pressure is operative to encourage the assembly upward. There is, of course, a downward force due to the ambient pressure on the same annular area above region 122 of the piston-like member 120, as well as the downward force of the coil spring 140, which may be varied as desired by rotation of the screw cap 134. Consequently, it may be seen that the force balance, i.e., the regulated pressure, is achieved when the following equation is satisfied:

$$F_s = P_{og}(A_{p1} - A_{p2}).$$

Thus it may be seen that in this case part of the outlet pressure is also balanced so that by appropriate selection of the various dimensions of the pressure regulator, dependent upon the specific requirements of the application, a particularly stiff or especially heavily preloaded coil spring requirement may be avoided. As before, pressure regulators of this type may be manufactured for a relatively low cost, using plastic injection molded parts for the more normally encountered pressure ranges, or may be fabricated of metal for higher pressure applications. Of course, various changes in detailed design, proportions, etc., may readily be incorporated in the design of the regulators in accordance with the present invention to accommodate flow rates, pressures, temperatures, corrosive fluids, etc., as an application may require.

Figure 8:
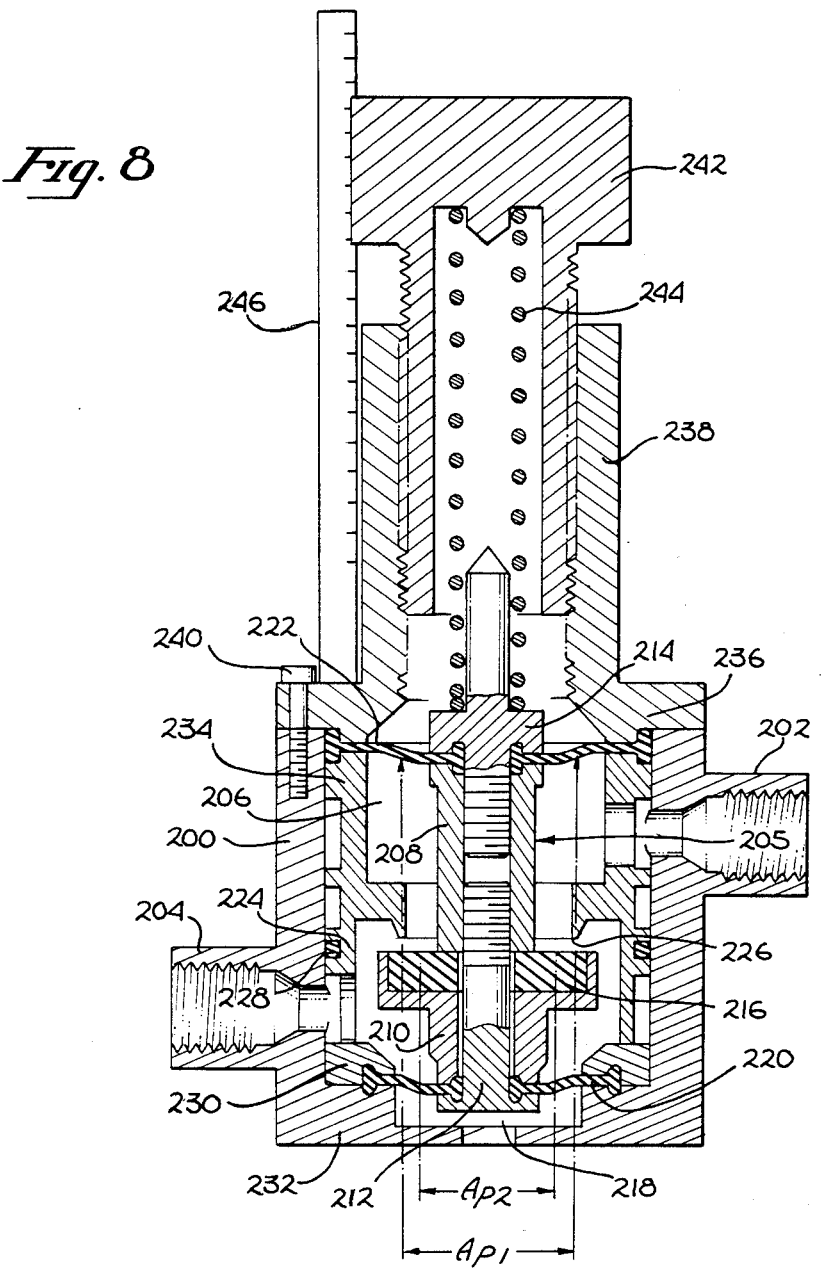
FIG. 8 is a vertical cross sectional view of a third embodiment of the present invention illustrating the use of diaphragms.

Referring now to FIG. 8, a third embodiment of the present invention is disclosed. It will be noted that the operation of this embodiment is similar to that of the previous embodiments, in that the inlet pressure is balanced, with an unbalanced output pressure working against the known spring force, acting downward, to regulate the position of a moving central piston-like assembly, generally indicated by the numeral 205. However, the embodiment of FIG. 8 differs from the earlier embodiments in that the O-rings used to seal the moving members in the earlier embodiments have been replaced with diaphragms to eliminate the sliding seals.

Lower body member 200 has an inlet port 202 and an outlet port 204 communicating with the interior region 206 thereof. Within the interior 206 is the piston-like assembly 205 comprised of a cylindrical member 208, a valve seat support 210, a lower screw member 212 and an upper screw member 214. Located between the cylindrical member 208 and the valve seat support member 210 is a rubber or rubber-like seal member 216. Also, trapped and sealably retained between support member 210 and the head 218 of lower screw member 212 is the inner periphery of a lower diaphragm 220. Similarly sealingly retained between upper screw member 214 and the top of cylindrical member 208 is the inner periphery of an upper diaphragm 222. The inner periphery of the diaphragms (as well as the outer peripheries thereof) are molded with an integral O-ring type sealing bead thereon which, when located in an appropriate groove on the mating parts, provides for an O-ring like seal with respect thereto. It also provides for positive anchoring of the inner and outer peripheries to resist radial distortion in the diaphragms in those regions as a result of the operating pressures thereon.

Located within the body 200 is a support member 224 which defines a downward directed valve seat 226 disposed to be intercepted by the top surface of seal member 216 when the piston-like assembly moves to an upward position (the assembly being shown in a lower regulating valve open position in FIG. 8). The support member 224 of course is appropriately ported to allow fluid communication between the inlet port 202 and the region above valve seat 226, and similar fluid communication between the region below valve seat 226 and the outlet port 204. An O-ring 228 seals the periphery of the support member 224 with the inner diameter of the lower valve body 200.

The outer periphery of the lower diaphragm 220 is retained between the lower portion 230 of support member 224 and the bottom 232 of the body 200. Similarly the outer periphery of the upper diaphragm 222 is supported between the upper portion 234 of support member 224 and the lower portion 236 of an upper body member 238 fastened to the lower body member by screws 240. Also the cavities below diaphragm 220 and above diaphragm 222 are vented to the atmosphere. The upper body member 238 is internally threaded to receive an adjustment screw member 242 entrapping coil spring 244 between the adjustment screw 242 and screw member 214 to provide an adjustable downward spring force on the piston-like assembly of the valve. A scale bar 246 fastened to upper body member 238 provides an indication of the regulated pressure when read in conjunction with the vertical position of the adjustment screw 242.

The operation of the embodiment of FIG. 8 is substantially the same as that of FIGS. 5 through 7. In particular, the inlet pressure through port 202 provides an upward force on diaphragm 222, part of which is transmitted to the body of the pressure regulator and part of which is transmitted inward to the moveable assembly 205. Each of these forces is proportional to the pressure on the diaphragm and accordingly, one can calculate an equivalent piston area for which the same pressure would create the same force on the moveable assembly 205. In the embodiment of FIG. 8, the various members supporting the upper diaphragm 222 are proportioned so that the equivalent area is equal to the area of the valve seat 226, which area is labeled $A_{p1}$ in FIG. 8, and is functionally equivalent to the area $A_{p1}$ of the embodiment of FIG. 6. The lower diaphragm 220, as well as the members on which it is supported, are proportioned so that the equivalent area of that diaphragm is a predetermined amount smaller than the area $A_{p1}$, i.e., specifically $A_{p1}$ as identified in FIG. 8. Here again this area is equivalent to the area $A_{p2}$ of FIG. 6. Thus the equation heretofore given for the operation of the embodiment of FIGS. 5 through 7 is also applicable to the embodiment of FIG. 8, if the equivalent areas for the two diaphragms are used in place of the two piston areas.

Figures 9, 10:
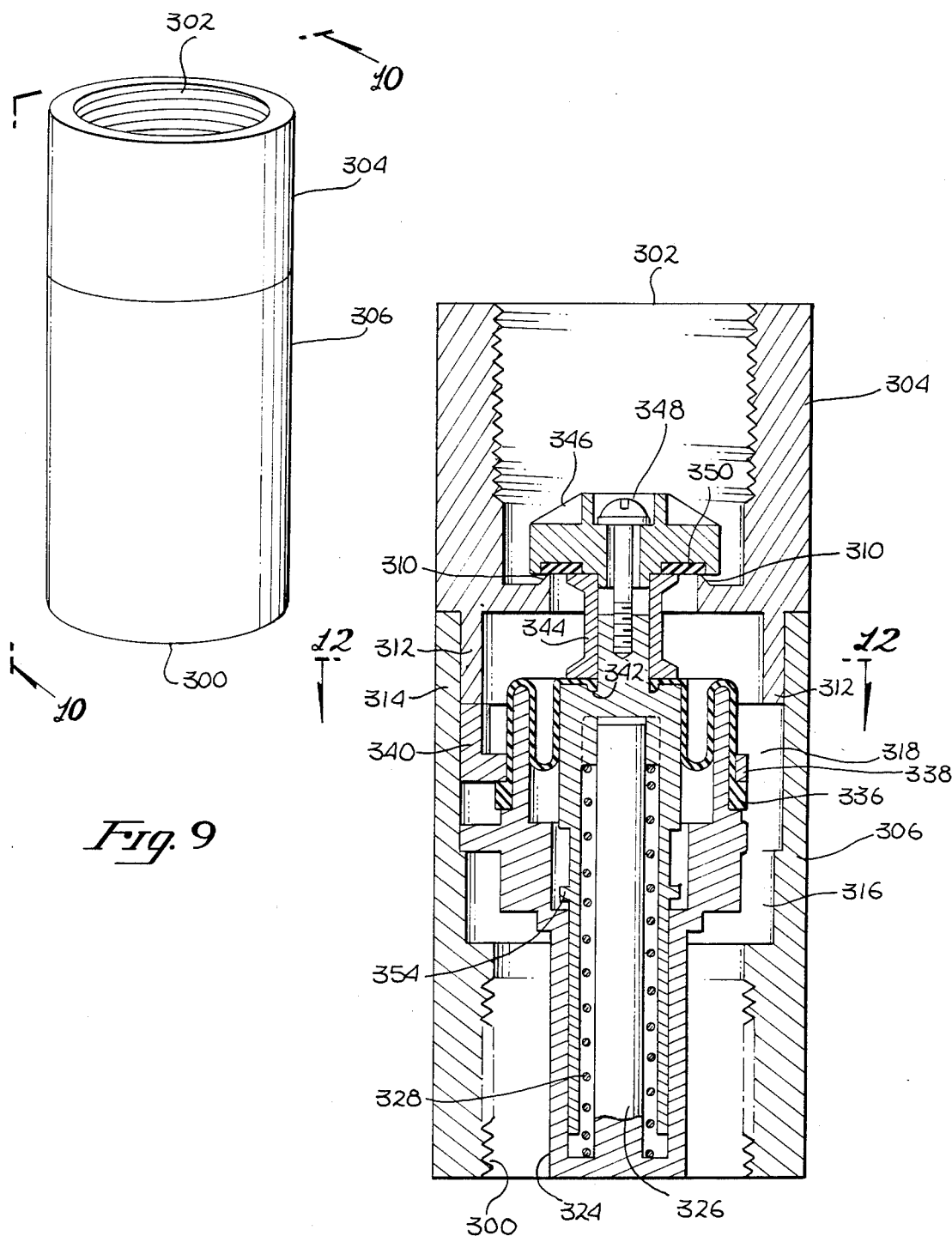

Now referring to FIG. 9, a still further embodiment may be seen. This embodiment is characterized by coaxial inlet and outlet ports 300 and 302 respectively, both of which have internal pipe threads for threading onto inlet and outlet pipes. The body of the embodiment of FIG. 9 is comprised of upper and lower body members 304 and 306. The various internal parts of the embodiment of FIG. 9 and the intercooperation thereof may be seen in the cross sections of FIGS. 10 and 11, which are cross sections taken on an expanded scale and illustrating the regulator in the regulator closed and in the regulator opened positions, respectively. As may be seen in these figures, the upper body member 304 has a valve seat 310 integral therewith, with a downward projecting annular region 312 fitting within and being cemented or otherwise fastened to the upward extending portion 314 of the lower body member 306. The lower body member 306 is ported in the region below the protrusion 312 on the upper body member, as is perhaps best illustrated in FIG. 12. In particular, in the embodiment shown, there are three ported regions 316 which, together with the inlet port region 300 and annular region 318, provide fluid communication between the inlet and region 320 just below the valve seat 310. It will be noted also that the webs 322 (see particularly FIG. 12) support an inner member 324 providing a base and stabilizing support 326 for an internal spring 328 acting in compression against a valve actuating member 330 thereabove.

The upper part 332 of member 324 provides a support for an elastic diaphragm 334 which effectively seals the internal region of member 324 from the fluid within the pressure regulator. The outer periphery of diaphragm 334 has an enlarged region 336 which is retained in position on member 324 by a clamp ring 338 forced into and retained in the position shown by a plurality of leg-like upward protrusions 340 thereon retained in position by the annular extension 312 of upper body member 304. The inner periphery of the diaphragm likewise has an enlarged region 342 resting within a cooperatively disposed relief at the top of member 324 and clamped in that position by a combination of spool-like standoff member 344, valve closure member 346 and retaining screw 348. The valve closure member, of course, has a cooperatively disposed elastic seal member 350 to provide the desired seal against the valve seat 310 when the valve closure member 346 is in the valve closed position because of the regulator in FIG. 10 regulating at the desired outlet pressure in a zero flow condition. It will be noted from the figures that the valve actuating member 330 has a downward projecting extension 352 which has a close slide fit in the lower part of member 324 to provide a vertical guide for the actuating member.

It will be noted from FIGS. 11 and 12 that the diaphragm 334 has a single full convolution and does not substantially change shape but rather effectively rolls along the inner diameter of projection 332 of the lower body 306 and the outer diameter of the valve actuating member 330. In the preferred embodiment however, the diaphragm is not molded in the shape shown, but rather is molded in a truncated, substantially conical (unconvoluted) shape, the top and bottom thereof coinciding in geometry with the top and bottom shown in the drawing. The finished diaphragm is then forced into the convoluted shape for assembly as shown, in which shape it will remain. The molding of the diaphragm in this form however, rather than in the convoluted form, ultimately results in a convoluted diaphragm which has no preferred position in the assembly, thereby avoiding any significant tendency of the diaphragm to itself encourage the regulator toward an open or closed position or some intermediate position therebetween.

As previously described, in general it is desired to pick the effective diameter of the diaphragm 334 to be substantially equal to the diameter of valve seat 310 so that the inlet pressure provides substantially zero net force on the moveable pressure regulating valve member, with the result that the outlet pressure in port 302 is determined by the balance between the outlet pressure times the area of the valve seat, and the force of the compression spring 328. It has been found however, that in some applications even better regulation can be obtained by a significant deviation from such pressure balancing. By way of example, consider a typical application for the present invention, namely a drinking fountain wherein line pressure may vary radically with momentary water flow demands of other devices on the same line, with time of day or from day to day. It is these variations that frequently give water fountains an output comprising a mere dribble at one moment and a squirt in the eye only a short time thereafter. However, regardless of the supply line pressure variation, the ideal fountain pressure and flow rate is essentially predetermined by fountain design independent of the specific installation thereof. Accordingly, one can plot a curve of valve position versus line pressure for the desired constant output pressure and flow rate of a given pressure regulator, as shown in FIG. 17. Also, since coil spring 328 necessarily has a finite preload, some of which is released as the valve moves toward the open position, one may plot spring force against valve position, generally a straight line function, as shown in FIG. 18. Combining these two curves, one can plot spring force versus line pressure for the same constant output pressure and flow rate, as shown in FIG. 19. In general this curve will deviate somewhat from a straight line, though may be reasonably approximated by a straight line over the range of line pressures of interest by the equation $F_s = F_o + KP_L$ where $F_s$ is the spring force, $F_o$ is the linearized spring force for zero line pressure, $P_L$ is the line pressure, and K is the slope of the spring force versus line pressure curve. Since the spring force, which is a valve opening force, increases with line pressure, better regulation is obtained if there is an offsetting line pressure dependent valve closing force. This, of course, is readily obtained by effectively "over pressure balancing" the regulator, more specifically by making the effective area of the diaphragm 334 slightly larger than the effective area of the valve seat 310. Thus instead of a spring force $F_s$ tending to open the valve against the outlet pressure, the spring force is reduced by a line pressure dependent factor, so that the net valve opening force acting against the outlet pressure tending to close the valve is given by the equation $F_s - AP_L$ where A is the incremental area by which the effective area of diaphragm 334 exceeds the effective area of the valve seat 310. Putting this in the foregoing equation results in the following:

$$F_s - AP_L = F_O + KP_L - AP_L$$

Accordingly, for the desired constant output pressure and flow rate, the line pressure dependence of the net valve opening force and thus the line pressure dependence in the outlet pressure caused by the finite length of spring 328 (and to a lesser extent the fluid flow characteristics around valve seat 310 and valve closure members 346 and 350) may essentially be eliminated if the effective area of diaphragm 334 exceeds the effective area of valve seat 310 by an amount equal to K, the slope of the spring force versus line pressure curve over the expected range of the line pressure and for the desired constant output pressure and flow rate. Further, while the extent of the ideal pressure unbalancing will vary if the desired output pressure and/or flow rate are changed, approximations applicable to most uses of a given pressure regulating valve may be made. In particular, normally the desired regulated output pressure is substantially below normal line pressure, which tends to de-emphasize the effect of the output pressure, allowing that parameter to be changed for different applications without substantial effect on the desired pressure regulation in the presence of substantial line pressure variations. Further, the normal flow rates for a particular pressure regulator tend to be fairly well bounded throughout various applications, as particularly high flow rates suggest the use of a different (larger) valve, and particularly low flow rates suggest that the use of a smaller valve would be appropriate. Accordingly, a substantial pressure regulation enhancement can be achieved in accordance with the foregoing concepts of the present invention, and particularly compact coil spring assemblies may be used, through the utilization of the foregoing inlet pressure overbalancing or unbalancing on the inlet pressure side toward a valve closed condition.

Now referring to FIG. 13, a perspective view of a still further alternate embodiment may be seen. This embodiment is very similar to the embodiment of FIG. 9, though includes a further feature of adjustability in the regulated pressure. Because of the general similarities in design and function of many of the parts making up the regulator, parts in this embodiment (further illustrated in detail in FIGS. 14, 15 and 16) having substantially the same design and function as the corresponding parts of the embodiment of FIG. 9 as illustrated in detail in FIGS. 10 through 12 are identified with the same numerals followed by the postscript (a), with the prior description of the general design and function thereof being also applicable to this further embodiment. Thus, as shown in FIG. 13, the pressure regulating valve is provided with coaxial inlet and outlet ports 300a and 302a, and lower and upper body members 306a and 304a respectively. In addition however, is an adjustment collar 400 threadedly engaging threads 402 on the lower body member 306a.

FIGS. 15 and 15 are cross sections of the embodiment of FIG. 13, similar to the cross sections of FIGS. 10 and 11 respectively. As may be seen by a comparison of these figures and the numbering thereof, most of the parts have the physical and functional equivalents found in the earlier embodiment. The primary difference is that a valve actuating member 330a has a central post 404 thereon having a loose sliding fit within tubular extension 406 and member 408, the coil spring 328a working between the valve actuating member 330a and member 408. Member 408 in turn rests on pin 410 passing through slots in the lower body member 306a so as to engage a lip on the adjustment collar 400 (shown in the figures as being near its upper limit or highest regulating pressure). In that regard, it will be noted from FIGS. 14 and 15 that the ported regions 316a are only two in number and symmetrical, with the vertical slots in lower body member 306a for the vertical translation of pin 410 being in the webs separating the ports 316a so that as before, the bias spring mechanism as well as the adjustment mechanism therefor are isolated from the regions in fluid communication between the inlet and outlet ports. In fact, it may be seen with this as well as the earlier embodiments, that such isolation minimizes the nature and extent of the seals required to prevent fluid leakage, in the single diaphragm units effectively eliminating all sliding and rotating seals. It also eliminates the need for a particularly corrosion resistant spring for the bias spring, even when pressure regulating valves are being used with corrosive fluids. In that regard, the present invention pressure regulators are well suited to either metal or plastic fabrication, or any combination thereof as desired.

The pressure regulators of the present invention are easy to manufacture and assemble and will deliver a fluid at the desired regulated pressure with very good accuracy in spite of reasonable pressure variations in the supply system. Of course, while the invention has been disclosed and described with respect to certain preferred embodiments thereof, it will be understood to those skilled in the art that various changes in form and detail may be made therein without departing from the spirit and scope of the invention.

We claim:

1. A pressure regulator for receiving fluid from a fluid source and delivering fluid at a regulated pressure comprising first and second housing members, each having first and second ends, said first housing member having an inlet port at said first end thereof, said second housing member having an outlet port at said first end thereof and a valve seat having a valve seat opening therethrough adjacent said second end and facing said first end thereof, said first and second housing members being joined adjacent said second ends thereof so that said inlet port, said outlet port and said valve seat are all coaxial, said first housing member having a spring housing integral therewith and supported internally to said first housing member of at least one support so as to allow fluid flow therebetween, said spring housing being closed adjacent the inlet port end thereof, a compression spring within said spring housing, a valve closure assembly fitting at least in part within said spring housing and extending through said valve seat opening, said valve closure assembly having a valve closure member facing said valve seat, said valve closure assembly being moveable along the axis of said valve seat between a closed position with said valve closure member displaced from said valve seat and toward said second port, said compression spring urging said valve closure assembly to said open position, a diaphragm sealingly fastened adjacent its outer periphery to said spring housing and sealingly fastened adjacent its inner periphery to said valve closure assembly, thereby sealing said spring housing and isolating said spring from fluid in said inlet and outlet ports.

2. The pressure regulator of claim 1 wherein the effective area of said diaphragm is substantially equally to the area of said valve seat, whereby the pressure in said inlet port produces substantially zero net force on said valve closure assembly.

3. The pressure regulator of claim 1 wherein the effective area of said diaphragm is a predetermined amount larger than the area of said valve seat.

4. The pressure regulator of claim 1 wherein the effective area of said diaphragm is larger than the area of said valve seat to cause a predetermined inlet pressure dependent force tending to move said valve closure assembly toward said closed position, said spring having a predetermined and finite spring rate to cause a spring force urging said valve closure assembly to the open position dependent on the position of said valve closure assembly, said diaphragm area being selected for a predetermined flow rate through said pressure regulator to cause said predetermined inlet pressure dependent force to approximately compensate for changes in the force of said spring caused by inlet pressure dependent changes in the valve assembly position for the predetermined flow rate, whereby for a predetermined flow rate through said pressure regulator, the regulating pressure in the said outlet port will be substantially inlet pressure independent.

5. The pressure regulator of claim 1 wherein said compression spring acts between said valve closure assembly and said spring housing.

6. The pressure regulator of claim 1 further comprised of a spring preloading member, and an adjustment member, manually adjustable in position, said spring preloading member extending through said first housing member, said at least one spring housing support, and into said spring housing, said compression spring acting between said valve closure assembly and said preloading member, said preloading member being responsive to said adjustment member to vary the compression of said compression spring, thereby adjusting the regulating pressure of said pressure regulator.

7. The pressure regulator of claim 6 wherein said adjustment member is substantially concentric with and threadedly engages said first housing member so as to be rotatable with respect thereto to controllably move along the axis thereof.

8. The pressure regulator of claim 1 wherein said diaphragm is a convoluted diaphragm.

9. The pressure regulator of claim 4 wherein said diaphragm is an elastomeric diaphragm molded in an unconvoluted form and deflected into a convoluted form on assembly of said pressure regulator, whereby said diaphragm does not have a preferred position in the assembled regulator.

* * * * *